United States Patent [19]

Gold

[11] Patent Number: 4,762,865

[45] Date of Patent: * Aug. 9, 1988

[54] EPOXY COATINGS FOR COMPUTER HARD DISKS AND METAL COIL DECORATION AND PROTECTION

[76] Inventor: Marvin H. Gold, 5050 Dory Way, Fair Oaks, Calif. 95628

[*] Notice: The portion of the term of this patent subsequent to Mar. 24, 2004 has been disclaimed.

[21] Appl. No.: 15,740

[22] Filed: Feb. 17, 1987

Related U.S. Application Data

[63] Continuation of Ser. No. 593,084, Mar. 26, 1984, Pat. No. 4,652,388.

[51] Int. Cl.[4] .......................... C08K 3/20; C04B 35/04
[52] U.S. Cl. ................................ 523/411; 252/62.54; 252/62.53; 428/694
[58] Field of Search .................... 252/62.54, 62.53; 428/694; 523/411

[56] References Cited

U.S. PATENT DOCUMENTS

| | | | |
|---|---|---|---|
| 4,070,522 | 1/1978 | Ogasa et al. | 428/336 |
| 4,135,036 | 1/1979 | Mukaida et al. | 428/900 |
| 4,211,664 | 7/1980 | Dixon et al. | 252/62.54 |
| 4,413,070 | 11/1983 | Rembaum | 252/62.54 |
| 4,493,778 | 1/1985 | Igbal | 252/62.54 |
| 4,585,702 | 4/1986 | Osborn et al. | 252/62.54 |
| 4,652,388 | 3/1987 | Gold | 252/62.54 |

Primary Examiner—John F. Niebling
Assistant Examiner—Steven P. Marquis
Attorney, Agent, or Firm—Mark C. Jacobs

[57] ABSTRACT

Aqueous dispersion coatings as binders for magnetic particles in the manufacture of data processing magnetic hard disks, which are used in conjunction with Winchester Disc Drives.

The coatings can also be used for the decoration of metallic coils prior to the stamping of parts therefrom.

26 Claims, No Drawings

EPOXY COATINGS FOR COMPUTER HARD DISKS AND METAL COIL DECORATION AND PROTECTION

RELATION TO OTHER CASES

This application is a continuation in part of Ser. No. 593,084, filed 03/26/84, now U.S. Pat. No. 4,652,388.

FIELD OF INVENTION

This invention pertains to rigid magnetic media and a process of making same.

BACKGROUND OF THE INVENTION

Many patents have been issued pertaining to the manufacture of magnetic Winchester hard discs for computers and the like. Such giants of the industry as Memorex, Dysan, Charlton Associates and Nashua in the U.S.A., and other companies in Japan are producing such products.

In general the standard practice in the industry is to deposit a slurry of magnetic oxides (or magnetic metal particles) in an organic solvent system containing dissolved reactive epoxy resin and a phenolic curing agent. The organic solvent is evaporated and then the metal plate is heated to an elevated temperature to effect the cure of the epoxy resin binder system.

In such a process the disadvantages are obvious. The evaporation of organic solvents into the atmosphere creates significant air pollution. It is expensive in terms of loss of costly solvent, not to mention the possibility of fire and explosion hazard and the concomitant higher insurance costs. In instances where solvent recovery systems are employed there is the additional expense of the capital investment as well as the continuing operating costs.

If there is no recovery system, the loss of solvent due to volatilization, is not only a health hazard to workers, but is of great expense to the manufacturer. Also the fire and explosion hazard effects insurance costs. Air pollution prevention means, such as scrubbers for removal of organic vapors are high in cost.

There is a need, therefore, for a mechanism to reduce such added manufacturing costs. Such a procedure is found in the instant invention which eliminates the use of organic solvents.

It is an object of this invention to provide a binder system for use in the manufacture of and disks which system is free from organic solvent.

It is another object to provide a binder system for magnetic particles for hard disks comprising a aqueous dispersion.

Yet another object is to provide a water based binder for pigment particles that gives rise to excellent adhesion between said particles and the coating substrate (base), i.e. the metal plate.

It is a yet further object to prepare a water based dispersion magnetic media that is suitable for disks used on Winchester drives of all sizes, 14, 8, 5¼ and 3½ inch.

A still further object is to provide lower cost, high quality rigid metallic discs.

Other objects of the invention will in part be obvious and will in part appear hereinafter.

The invention accordingly comprises the several steps and the relation and order of one or more of such steps with respect to each of the others and the product possessing the features, properties and relation of elements which are exemplified in the following detailed description and the scope of the application of which will be indicated in the appended claims.

For a fuller understanding of the nature and objects of the invention, reference should be had to the following detailed description.

SUMMARY OF THE INVENTION

Coating compositions are disclosed for application upon a suitable metal base material for the preparation of rigid magnetic discs for the recording of information. The coating composition is deposited on the film from an aqueous dispersion rather than from an organic solvent. The coatings can also be applied to metallic coils to decorate and protect the metal prior to the formation of metallic parts.

DESCRIPTION OF THE PREFERRED EMBODIMENT

There are many known disadvantages to the deposition of magnetic films from an organic solvent system. These have been touched on briefly elsewhere herein. When employing the processes disclosed herein however, and the compositions made according to such processes, most if not all of the disadvantages of the solvent based systems can be overcome. The only effluent is water, and in most locations in this country and in other nations, this is not detrimental.

I have found that there are solid epoxy resins, which when dispersed in an aqueous medium and mixed with certain other ingredients, which will be described below, can be used as the binder for an aqueous based magnetic coating formulation.

It is well known that the physical and mechanical properties such as hardness, tensile strength, brittleness, elongation, resiliences, etc., of the epoxy resin system is a function of the distance or chain length between the reactive functional groups in the reactive epoxy monomer. When this monomer is dissolved in a conventional organic solvent, the viscosity of the resulting solution-slurry at any given resin concentration, is a function of the molecular weight. The higher the molecular weight, the greater is the viscosity. Thus the ability to choose desirable physical and mechanical characteristics is limited to a degree by the flow properties and viscosities that are most readily handled in the manufacturing operation. In this invention, surprisingly, I have been able to overcome this disadvantage considerably. I have found that by using solid epoxy resins dispersed in an aqueous medium, along with the magnetic particles and representative amounts of the Additives A and B described below that I can have wide latitude in choice of both equivalent and molecular weights of these solid epoxy resins. In such systems the viscosity of the slurry is independent of the molecular weight of the resin system. Thus selections can be made from the higher molecular weight resins as well as the lower molecular weight resins or their mixtures in any proportion. In particular I have found that I can achieve good coatings, having excellent adhesion, flexibility and scratch resistance, with epoxy resins ranging in equivalent weights from 450 to 1000, although both higher and possibly lower equivalent weights are applicable. In particular I have found that Shell's EPON Resins 2002 and 2004 as well as Dow's DER 661, 662 and 664 give excellent coatings.

To be deemed satisfactory ingredients for use in the instant process, the magnetic particle containing films formed from any given epoxy polymer must satisfactorily pass a plurality of evaluation tests. These tests are applied not to the basic polymer films but to the coated metal substrates. Thus when a film forming material is used as a binder for magnetic particles, it must be capable of passing an adhesive tape test, a scratch test, and a crease test. If the end product cannot pass these tests, then the polymeric material is deemed unsatisfactory for the instant technique. The suitable resins can be based upon Bisphenol A. See details below.

What I have found therefore is the fact that certain polymeric epoxy resins when combined in the manner to be described below, with Additives A and B, along with surface active agents, defoamers, lubricants, and other "finishing" agents, can when mixed with magnetic particles yield a film forming composition with sufficient binding of the magnetic particles (metal or metal oxide) to the coating substrate to yield an acceptable media in the format of a rigid or Winchester disk.

In brief according to my invention, the required amount of pulverized solid epoxy resin is blended with the magnetic particles and to this mixture is added the surfactants, dispersants, my Additives A and B, antifoaming agents and any other processing aids. To this total mix is to be added sufficient water to yield the desire viscosity and flow characteristics. The mix is all ground together to give a colloidal dispersion by means of any one of a wide variety of commercial mechanisms (i.e. sand mill, 3 roll ink or paint mill, etc.,). The dispersion is filtered to remove large particles, spread on a rotating aluminum disk, air dried and cured in an oven at 400° F. Good adherent coatings are produced, which are now ready for fine polishing in the standard manner prior to final use.

Having set out an overview of the invention, the following constitutes a more detailed description thereof.

ADDITIVE A

A wide variety of compounds are useful as the "Additive A". In general these are monomeric compounds or mixtures thereof. Compositions falling within the formula have the property of being water soluble or at least water dispersible as well as providing a plasticizing effect on the underlying polymer of the commercial latex as well as plasticizing effect on Additive B. The compounds correspond to the general formula:

$$Y-\overset{O}{\underset{\|}{C}}-\overset{X}{\underset{|}{N}}-CH_2-P$$

where Y may be H, $CH_3-$, $C_2H_5-$, $$CH_2=CH-, \; CH_2=\overset{CH_3}{\underset{|}{C}}-, \; CH_3\overset{CH_3}{\underset{|}{CH}}-, \; CH_3CH_2CH_2-,$$

$$CH_3CH_2\overset{CH_3}{\underset{|}{CH}}-, \; HOCH_2CH_2-, \; HOCH_2\overset{CH_3}{\underset{|}{CH}}-, \; CH_3OCH_2-,$$

$CH_3OCH_2CH_2-$, $ZCH_2-$, $Z_2CH-$, $ZCH_2CH_2$ and wherein Z is F or Cl.

P may be represented by polyhydroxybenzene compounds such as, but not limited to, catechol, resorcinol, hydroquinone, t-butyl catechol, and hydroxethylresorcinol, among others. P may also be substituted or unsubstituted o, m or p aminophenols or aromatic diamines. Typical examples include $$Y-\overset{O}{\underset{\|}{C}}-\overset{X}{\underset{|}{N}}-CH_2-\overset{H}{\underset{|}{N}}-C_6-H_4OH \; or$$

$$Y-\overset{O}{\underset{\|}{C}}-\overset{X}{\underset{|}{N}}-CH_2-\overset{H}{\underset{|}{N}}-C_6H_4-NH_2$$

wherein X is represent by H—, $CH_3$— or $HOCH_2CH_2$— and Y is as defined above.

ADDITIVE B

Additive B is a complex water soluble or water dispersible polymer which has at least five percent (5%) of its monomeric constituents derived from acrylamide or methacrylamide. The remaining approximately ninety-five percent (95%) of the monomer's units may be one or more of any vinyl monomer, which is copolymerized with the acrylamide or methacrylamide to yield a water soluble or water dispersible system. This copolymerizate must be further condensed first with formaldehyde and then with any of the polyhydroxy aromatics, aminohydroxy aromatics or diamino aromatics designated as a "P variety" as disclosed under Additive A, above, to yield the final Additive B polymer. Its formula is set forth below:

$$\text{Comonomer}-[CH_2CH]_{\overline{x}}-\text{Comonomer}$$
$$\underset{\underset{NH-CH_2-P}{|}}{\underset{CO}{|}}$$

The grouping: $P-CH_2-$ must be substituted to the extent of at least five percent (5%) of the total monomeric units in the polymer chain, and up to as high a value as will still yield a water soluble or water dispersible system. This may be anywhere from five percent (5%) to ninety-five percent (95%) depending upon the system involved. However, I have found that the most generally useful materials have a degree of substitution of from twelve percent (12%) to sixty-five percent (65%) and I prefer to use a degree of substitution of from twenty percent (20%) to thirty-five percent (35%). Also I prefer that the monomeric constituents of acrylamide or methacrylamide in the polymer backbone be greater than fifty percent (50%).

This invention requires only partial substitution of the polymeric amides and then only to the degree that water solubility or ready water dispersibility and swelling is retained.

The following specific examples shall be considered as exemplary of the instant invention. In the first example the term deionized water is utilized. In all the appearances of the word water, it shall be understood that deionized water, i.e. water with a low salt content is contemplated.

PREPARATION OF ADDITIVE A (Adhesive Plasticizer)

Example 1A

Condensation of Resorcinol with N-Hydroxymethyl Acrylamide

To 15 g of a commercial 48% N-hydroxymethyl acrylamide was added 15 g deionized water. Thus diluted, the solution has a pH of about 4. Then 0.15 ml of 10% sodium hydroxide was added, to raise the pH to 8.5–9. Then 9 g of solid resorcinol was added all at once with stirring. The solution was endothermic and upon completion of the addition the pH had dropped back to 4. Addition of 7 ml NaOH brought the pH back to 8.5–9. After allowing the reaction mixture to age overnight, it was deemed ready for use.

EXAMPLE 2A

Condensation of Catechol with N-Hydroxymethyl Acrylamide

In a beaker containing 30 g of 48% N-hydroxymethyl acrylamide was added 30 g water. This solution was made alkaline with 0.3 ml 10% NaOH, prior to the addition of 18 g solid catechol. The solution and reaction of the catechol was endothermic and was aided by heating the beaker on a water bath at 50°–60° C. for about ten (10) minutes. After standing one hour 15 ml more 10% NaOH were required to bring the pH back up to 8.5. After aging overnight the reaction mixture was ready for use.

Example 3A

Condensation of t-Butyl Catechol with N-Hydroxymethyl Acrylamide

To 10 g 48% N-hydroxymethyl acrylamide was added 10 ml water and 0.1 ml 2.2N NaOH. Then 8 g solid t-butyl catechol was added with stirring while heating on a warm water bath. Two layers were obtained but after addition of 1.5 ml 2.2N NaOH the mixture became clear and formed a homogeneous solution (pH 8.5–9). The mixture was bottled and allowed to age overnight prior to use.

EXAMPLE 4A

Condensation of m-Aminophenol with N-Hydroxymethyl Acrylamide

To a solution of 4.90 m-aminophenol in 25 ml hot water was added 7.5 ml 48% hydroxymethyl acrylamide. The reaction mixture was allowed to cool in a stoppered brown bottle and aged twenty-four (24) hours prior to use.

Example 5A

Condensation of m-Toluene Diamine with N-Hydroxymethyl Acrylamide

To a solution of 6.1 g m-toluenediamine in hot water (16 ml) was added 10.5 ml 48% hydroxymethyl acrylamide. Upon cooling the reaction mixture was bottled and stored overnight prior to use.

PREPARATION OF ADDITIVE B (Adhesive Polymers)

INTRODUCTION

In the following examples an acrylamide polymer was selected which met two criteria. First, that it could be dissolved in a sufficiently high concentration to yield a reasonable working viscosity; and at the same time there would be provided sufficient residual mass for incorporation with commercial latices to yield optimum adhesion characteristics. A polymer system which satisfies these requirements is American Cyanamide's Cyanomer P-26. It contains some 4 to 6% acrylic acid as a copolymer with the acrylamide. The reactions carried out in the following examples are schematically shown as follows:

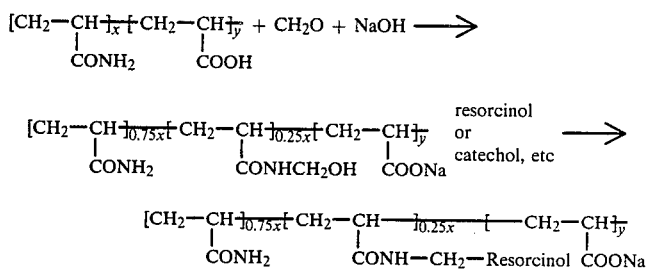

In order to retain aqueous solubility in most cases only about 25% of the amide groups were substituted with the methylene polyhydric phenols (i.e. resorcinols, catechols, hydroquinones) or the methylene amino aromatics (i.e. aminophenols, diaminoaromatics), as will be seen below.

EXAMPLE 1B

Preparation of Adhesive by Resorcinol Condensation

In a beaker of 160 ml of $H_2O$, 20 g of Cyanomer P-26 was slowly added with mechanical stirring to make sure that complete solution occurred. The initial pH was around 5. The addition of 2.5 ml of 1.77N NaOH brought the pH up to 8.5. Then 4.2 ml of 37% formaldehyde solution (enough to replace 25% of the amide groupings) was added and within a few minutes the pH had dropped back to 5. It now required 14 more ml 1.77N NaOH to bring the pH back up to 9 and hold this value for one hour. After such, 5.75 g solid resorcinol was added with stirring. All the resorcinol dissolved to yield a clear solution. The pH dropped back to 8. It then require 15 ml more 1.77N NaOH to bring the pH back up to 8.5. At this point the solution turned from clear to milky opaque. The mixture was bottled and allowed to age overnight before use.

Example 2B

Preparation of Adhesive—Resorcinol Condensation (Reverse Addition)

It was found that on a number of occasions that preparations of adhesive (Additive B) made according to Example 1B would gel shortly after preparation. By carrying out the addition with resorcinol in a reverse manner, a free flowing mobile solution was obtained with good reproducibility from batch to batch.

In a beaker, 20 g of Cyanomer P-26 was slowly added to 120 ml water with mechanical stirring. When that solution was complete a measurement was made of the initial pH. It was about 5. Then 4.2 ml 37% formaldehyde solution was stirred in followed by 10 ml 2.2N NaOH to bring the pH up to 6. An additional 7 ml of NaOH was required to raise the pH to 10. After standing one hour the viscous mixture was stirred slowly in a thin stream into a solution of 6 g of resorcinol dissolved in 40 ml water. At the end of the addition the pH had dropped to 7.5. The solution required 2 ml of 2.2N NaOH to bring the pH back up to 9. The greatly thinned reaction mixture was bottled and stored overnight prior to use.

Example 3B

Preparation of t-Butylcatechol Substituted Adhesive 20 g Cyanomer P-26 was dissolved in 160 ml water with good mechanical stirring. The solution required 6.5 ml of 2.2N NaOH to raise the pH to 8.5-9. To this was added 4.1 ml of 37% formaldehyde and the reaction mixture again became acidic. After standing ten minutes, 9 g of t-butylcatechol was added to yield a milky dispersion. This was followed by 10 ml 2.2N NaOH to bring the pH to 7.5. The dispersion darkened and after fifteen minutes more stirring the pH had dropped to 6-6.5. An additional 2 ml of the NaOH was added to raise the pH to 8.5. This product was bottled and stored prior to use.

Example 4B

Preparation of m-Aminophenol Substituted Adhesive

Using a Mixmaster, 20 g of Cyanomer P-26 was slowly added to 120 ml of water to yield a somewhat viscous solution. The pH was about 5 and after the addition of 3.5 ml 2.2N NaOH it was raised to 6.5. Then 4.2 ml of 37% formaldehyde was stirred in and the pH immediately dropped back to 5. Additional 2.2N NaOH was added incrementally until a total of 15 ml brought the pH up to 10. During this time and after standing one hour there was an appreciable increase in viscosity. At the end of the hour the mixture was neutralized by the addition of 6.5 ml of 0.5N HCl to pH 7-7.5.

In a separate bowl, 6 g of m-aminophenol was heated with 40 ml water to 60°-65° C. until it was all in solution. This solution was then well stirred while the polymethylolacrylamide solution was slowly added in a thin stream. A clear semi-viscous solution resulted having a pH 8. This was bottled and used in subsequent coating formulations.

Example 5B

Preparation of m-Toluene Diamine Substituted Adhesive

The preparation of this formulation was identical to that of Example 4B except that 6.3 g of m-toluene diamine was used in place of the 6 g of m-aminophenol.

PREPARATION OF COATINGS

In general, laboratory batches of coatings formulations were prepared in the following manner:

A requisite amount, as determined by the skill of the art, of a magnetic iron oxide or magnetic metal particles was placed in a glass mortar and to this was added surfactants, Additives A and B and water. This mixture was well ground with a glass pestle until a smooth creamy paste was obtained. A proportional amount of a suitable pulverized solid epoxy resin within the molecular weight range previously indicated was added to the paste along with more water and an optional anti-foaming agent. This total mixture was again ground up using a convention mill to a very smooth flowable dispersion. After filtration to remove large particles, the paste was then spread over a metallic surface, such as an aluminum disk by means of a doctor blade, allowed to air dry several hours. The resin was then cured in an oven at 400° for several hours.

It should be observed that no additional curing agent is added or required to cure the epoxy resin. This is because there is a large excess of phenolic, aromatic amine or amide unsaturated groups in the various types of Additives A and B present to perform this curing function. For example Additive A has both unsaturation and either phenolic or aromatic amine groups, i.e.:

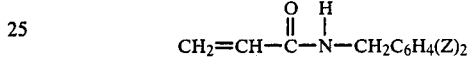

where Z=—OH or —NH$_2$ depending upon the nature of the molecule which has been condensed with N-methylol acrylamide. With this reagent there is adequate opportunity for chain extension and crosslinking.

Similarly for Additive B:

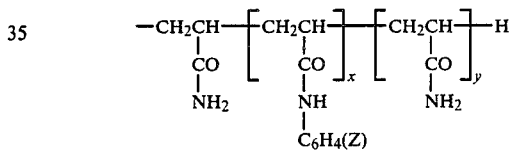

where Z=—OH or —NH$_2$ there are more than enough functional amide, phenolic (or aromatic amine) groups present, depending upon the nature of the aromatic compound condensed with the methylol substituted amide function, to completely cure the epoxy resin.

Turning now to the types of epoxy resins that may be employed herein, it is seen that the solid epoxy resins utilizable herein are based upon Bisphenol A, which is reacted with an epihalohydrin. Such polymers are of the formula:

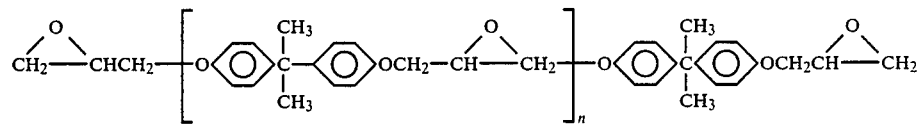

wherein n would be in the range of from about 1.5 to about 20-25, although I have chosen to use examples with the range of about 1.5 to 5.

If the chain length between active epoxy groups is too short the 180 to 400 or 500 (as with some of the lower equivalent weight liquid epoxies) there is a tendency toward brittleness or excessive rigidity in the resulting cured binder. For this reason, I prefer to use solid epoxy resins with equivalent weights ranging above 500.

The following example serve to demonstrate the practice of my invention but are by no means limiting.

GENERALIZED PROCEDURE FOR THE PREPARATION OF COATINGS

In general, laboratory batches of coating formulations were prepared in the following manner: A requisite amount of magnetic oxide was placed in a glass mortar and to this was added the desired amounts of pulverized solid epoxy resin, Additives A and B, any other processing aids and water. This mixture was well ground to a smooth, creamy free flowing dispersion and spread over heavy aluminum foil by means of a doctor blade. After air drying the coated aluminum samples were cured in an oven at 400° F. for one hour. Upon cooling the adhesive and flexural characteristics were checked by means of a Scotch tape test, folding and creasing and by scratching with a pointed sharp blade. The coatings described below responded well to these tests and are useful in the production of high quality, hard magnetic recording disks.

EXAMPLE 1

In this series the objective was to select optimum ratios of solid epoxy resin to magnetic oxide to achieve high solids loading the neighborhood of 70-80%. For these experiments, Shell's EPON 2002 (equivalent weight 675-760) was used in conjunction with a Hercules high coercivity, surface energized ferrite. The following amounts were ground and coated as described above.

5.5 g magnetic ferrite
0.10 ml Mazamide 80
0.10 ml MAFO 13, Mod 1
0.10 ml Cyanomer P-35
0.35 ml Additive A (resorcinol based)
0.8 ml Additive B (resorcinol based)
X g EPON 2002 (pulverized)
7.5-8 ml water The amount of epoxy resin was varied as shown below for each of examples 1A, 1B and 1C.
(a) X=1.0 g EPON 2002
(b) X=1.1 g EPON 2002
(c) X=1.2 g EPON 2002

Each of these 3 cases gave excellent adhesion, good crease and good scratch resistance.

EXAMPLE 2

In this case 1.0 g Dow's DER 661 (Eq. wt. 475-575) was used in place of the EPON 2002 in EXAMPLE 1a, with equally good results in accordance with the procedure of Example 1 above.

EXAMPLE 3

In this case 1.0 g of Dow's DER 662 (Eq. wt. 575-700) was used in place of EPON 2002 in EXAMPLE 1a, with equally good results.

EXAMPLE 4

In this case the same formulation as EXAMPLE 3 was used except that standard magnetic iron oxide and barium ferrite were each used in place of the high coercivity surface energized ferrite. The standard magnetic iron oxide produced a very thixotropic mix, while the barium ferrite produced a very fluid, free flowing mix. Both formulations produced good coatings.

I have found that in addition to the preparation of magnetic recording disks, my invention is also applicable to the production of decorative and protective coatings for a wide variety of metals. Commercially these coatings are generally applied in a continuous manner onto large coils of the metal, prior to the stamping of end products therefrom. In these cases the magnetic pigments in my dispersions are replaced by any of a wide variety of colored pigments, or insulating agents or conductive fillers. Examples 5-7 are illustrative of this aspect of my invention.

EXAMPLE 5

In this example 1.0 g of a higher equivalent weight (Dow DER 664, Eq. wt. 875-975) was used in place of EPON 2002 in EXAMPLE 1a. This mixture was coated on both aluminum and on steel. In both cases excellent adhesive coatings were produced.

EXAMPLE 6

In this example 5.5 g of yellow iron oxide pigment was used in place of the magnetic ferrite of EXAMPLE 1b. This was coated on sheet steel to give an excellent yellow coating.

EXAMPLE 7

In this example 5.5 g of Montana talc pigment was used in place of the magnetic ferrite in EXAMPLE 1b. This too gave an excellent off-white coating on sheet steel.

It is seen that the magnetically coated surfaces disclosed herein are useful in the recording of computer data, on Winchester hard disks. By properly manipulating the ingredients, and the ratio of one to another, which tasks can be accomplished readily by the artisan, the coating films prepared hereunder may be employed for any type of data collection. The compositions employed in accordance with the invention are independent of the base or substrate upon which they are coated. Thus any substrate such as steel, aluminum, copper, and other non-magnetic metal deemed suitable by the industry may serve as the substrate.

As to the color coated surfaces, such as that of Example 6, any other colored pigment that can be dissolved in a water based system may be employed. The foregoing examples are merely illustrative of my invention and the invention should not be limited to those described. For example as new commercial solid epoxy resins become available perhaps of an aliphatic or polyphenol type, many of them may also be used in my invention.

Since certain changes may be made in the above examples without departing from the scope of the invention herein involved, it is intended that all matter contained herein should be interpreted as limiting.

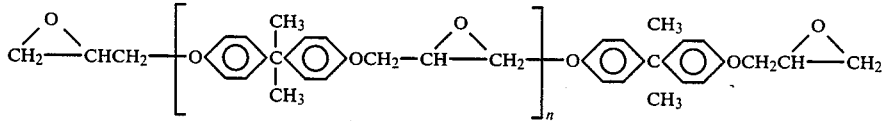

I claim:

1. A water based dispersion system for coating particles selected from the group consisting of magnetic and pigment particles onto a substrate comprising:
water sufficient to form a dispersion, at least one adhesive plasticizer (Additive A), at least one adhesive polymer (Additive B), at least one surface active agent, an optional dispersing agent, at least one solid epoxy resin of the formula

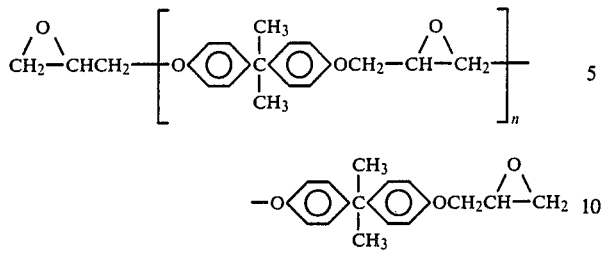

where n would range from about an average of 1.5 to 4 or 5 or greater, wherein Additive A is of the general formula

Y—CO—NX—CH$_2$—P and Y is selected from the group consisting of H, an akyl group of C$_1$-C$_4$, an alkylene group of C$_2$-C$_3$, an ethanol, propanol or isopropanol group, a 2-3 carbon ether group, and a C$_1$-C$_3$ haloalkyl group, said halo selected from the group consisting of being chloro or fluoro, wherein X is H or CH$_3$ and P is selected from the group consisting of moieties of polyhydroxybenzene compounds, substituted or unsubstituted ortho, meta and para aminophenols and aromatic diamines, and wherein Additive B is a water soluble or dispersible polymer which was formed by the copolymerization of a first component which has at least 5% of its monomer constitutents being derived from a monomer selected from the group consisting of acrylamide and methacrylamide, and the balance being a second component of one or more vinyl monomers copolymerizable with said first component, thereby having yielded an amido copolymerizate, said amido copolymerizate having been further condensed with formaldehyde to the extent of from 5% to 95% of the amide groups, said condensed amido copolymerizate having been still further condensed with a member selected from the group consisting of a polyhydroxy aromatic compound, an amino hydroxy aromatic compound, or a diamino aromatic compound, and sufficient magnetic or pigment particles of a size suitable for dispersion as a film upon a substrate.

2. The dispersion system of claim 1 wherein the particles are magnetic and suitable for use in the manufacture of a Winchester hard disk.

3. The composition of claim 2 further including a water dispersible solid epoxy resin of molecular weight of about 500 capable of binding magnetic particles.

4. The dispersion system of claim 1 wherein the particles are colored and suitable for forming a coating for metallic coils.

5. The dispersion system of claim 4 wherein the particles are Montana talc.

6. The dispersion system of claim 4 wherein the particles are yellow iron oxide.

7. The dispersion of claim 4 wherein the particle are any colored pigment suitable for dispersion in aqueous latices.

8. In the system of claim 1 wherein the adhesive plasticizer, Additive A, is a condensation product of N-hydroxymethylacrylamide with a soluble compound selected from the group consisting of polyhydroxyaromatic compounds, aminophenols and aromatic diamines.

9. In the composition of claim 8 wherein Additive A is a condensation product of N-hydroxymethyl acrylamide with a polyhydroxy aromatic compound, wherein said polyhydroxy aromatic compounds are selected from a group consisting of resorcinol, catechol, hydroquinone, hydroxyethyl resorcinol and n-butyl catechol.

10. In the composition of claim 8 wherein Additive A is a condensation product formed from the reaction of N-hydroxymethyl acrylamide with aminophenols, said aminophenols being selected from the group consisting of o, m and p-aminophenol, the methyl aminophenols and the hydroxyethyl aminophenols.

11. In the composition of claims 8 wherein Additive A is a condensation product formed from the reaction of N-hydroxymethyl acrylamide with aromatic diamino compounds, such members of the diamino aromatics being selected from the o, m and p-diamino benzenes, the o, m and p-diamino toluenes and the various isomers of the hydroxyethyl diamino benzenes.

12. In the system of claim 1 wherein the adhesive polymer, Additive B, is a condensation product of polymers and copolymers of acrylamide with a partial molecular equivalent of formaldehyde, followed by further condensation with a soluble compound selected from a group consisting of polyhydroxy aromatic compounds, aminophenols, and aromatic diamines.

13. In the composition of claim 12 wherein Additive B is a condensation product of polymers and copolymers of acrylamide with a partial molecular equivalent of formaldehyde, followed by a further condensation with a soluble compound selected from the group consisting of a polyhydroxy aromatic compound selected from the group consisting of resorcinol, catechol, hydroquinone, hydroxyethyl resorcinol and n-butyl catechol.

14. In the composition of claim 12 wherein Additive B is a condensation product of polymers and copolymers of acrylamide with a partial molecular equivalent of formaldehyde, followed by further condensation with a soluble aminophenol compound selected from the group consisting of o, m, and p-aminophenol, the methyl-aminophenols and hydroxyethyl aminophenols.

15. In the composition of claim 12 wherein Additive B is a condensation product of polymers and copolymers of acrylamide with a partial molecular equivalent of formaldehyde, followed by further condensation with a soluble aromatic diamine selected from the group consisting of o, m and p-diamino benzene, diaminotoluenes and the hydroxyethyl diaminobenzenes.

16. A water based dispersion system for coating magnetic particles onto a substrate composition as in claim 1 wherein there is water sufficient to form a dispersion of the magnetic particles with proportional amounts of Additives A and B and a solid epoxy resin capable of binding magnetic particles, said resin being of the formula:

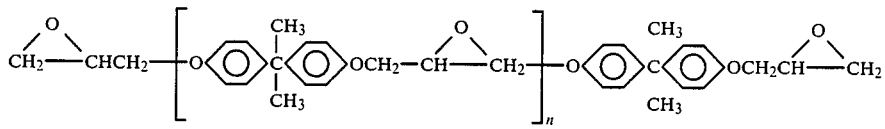

where n would range from about an average of 1.5 to 4 or 5 or greater.

17. In the system of claim 1 wherein the surface active agent is a mixture of a higher alkyl succino sulfate and a fatty acid amide of diethanolamine.

18. In the system of claim 1 wherein the surface active agent is a mixture of a fatty acid amide of diethanolamine and a salt of a complex amphoteric aminoacid.

19. In the system of claim 1 wherein the surface active agent is one member of the group consisting of a mixture of a higher alkyl succino sulfate and a complex organic phosphate ester acid and a surface active silicone compound.

20. In the system of claim 1 wherein the composition further including a dispersant which is a low molecular weight salt of polyacrylic acid.

21. A water based dispersion system for coating magnetic particles onto a substrate comprising:
I. water sufficient to form a dispersion;
II. a magnetic iron oxide suitable for audio, video and data recording;
III. an adhesive plasticizer, Additive A, prepared by the combination of N-hydroxymethyl acrylamide with a compound Y;
IV. an adhesive polymer Additive B, which polymer is prepared by the condensation of polymers and copolymers of acylamide with about 0.25 molecular equivalent of a compound Y;
wherein said compound Y is selected from the group consisting of polyhydroxy aromatics, the amino phenols and the aromatic diamines,
V. a solid epoxy resin of the formula:

where n would range from about an average of 1.5 to 4 or 5 or greater;
VI. a surfactant;
VII. an optional dispersant.

22. A hard disk comprising a data recording industry substrate suitable for the recording of information, coated with the dispersion of claim 21.

23. A water based dispersion system for coating magnetic particles onto a substrate comprising:
water sufficient to form a dispersion with all of the following: a high coercivity magnetic iron oxide, an adhesive plasticizer prepared by the condensation of N-hydroxymethyl acrylamide with an equivalent amount of resorcinol, an adhesive binder prepared by the condensation of a polyacrylamide with one-fourth the molecular equivalent of formaldehyde followed by further condensation with catechol, a Bisphenol A based solid epoxy resin, a surfactant mixture of an oleic acid amide of diethanolamine and a salt of a complex amphoteric amino acid, a dispersant and an optional anti-foam agent.

24. The dispersion system of claim 23 deposited upon substrate suitable as a substrate for the recording of information.

25. A hard magnetic disk composition comprising a magnetic ferrite, water, a resorcinol based Additive A; a meta-aminophenol based Additive B;
a solid epoxy resin, a dispersing agent, a surface active agent, and sufficient water for processing.

26. In the composition of claim 25, wherein the Additive A and the Additive B are each meta-toluene diamine based.

* * * * *